United States Patent
Schwartz et al.

(10) Patent No.: US 9,015,184 B2
(45) Date of Patent: Apr. 21, 2015

(54) PROTOCOL COMPLIANT ARCHIVING

(75) Inventors: Richard Herschel Schwartz, Nashua, NH (US); Tarcio Constant, Westford, MA (US); Scott Alan Lemieux, Cape Neddick, ME (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 184 days.

(21) Appl. No.: 13/526,742

(22) Filed: Jun. 19, 2012

(65) Prior Publication Data
US 2013/0339308 A1 Dec. 19, 2013

(51) Int. Cl.
*G06F 17/30* (2006.01)

(52) U.S. Cl.
CPC .................. *G06F 17/30595* (2013.01)

(58) Field of Classification Search
CPC .................. G06F 17/30215; G06F 17/30595
USPC .................. 707/673, 999.204, 667
See application file for complete search history.

(56) References Cited

U.S. PATENT DOCUMENTS

| 6,317,751 | B1 | 11/2001 | Yeger et al. |
| 6,519,568 | B1 | 2/2003 | Harvey et al. |
| 7,536,423 | B2* | 5/2009 | Brinkmoeller et al. ............... 1/1 |
| 7,590,837 | B2 | 9/2009 | Bhansali et al. |
| 7,917,756 | B2* | 3/2011 | Dreymann ..................... 713/170 |
| 8,255,683 | B2* | 8/2012 | Dickinson et al. ............ 713/153 |
| 8,326,931 | B2* | 12/2012 | Little et al. ..................... 709/206 |
| 2003/0018657 | A1 | 1/2003 | Monday |
| 2005/0207350 | A1* | 9/2005 | Bloebaum ..................... 370/252 |

OTHER PUBLICATIONS

Best Practices in Humanitarian Information Management and Exchange, Feb, 5-8, 2002, https://docs.google.com/document/d/19x0gPPVmASsLkZ2LiaGYrRHrdOglPOxMVdSx-zal.
Operational Guidance on Responsibilities of Cluster/sector Leads & OCHA in Information Management, Oct. 17, 2007,http://oneresponse.info/publicdocuments/Operational_Guidance_IM.

* cited by examiner

*Primary Examiner* — Miranda Le
(74) *Attorney, Agent, or Firm* — Hewlett-Packard Patent Department

(57) ABSTRACT

Disclosed herein are techniques for archiving data objects. It is determined whether a data object was rejected by an archiving module due to an information field thereof violating a protocol. If it is determined that the data object was rejected due to violation of the protocol, a compliant information field that complies with the protocol is generated such that the compliant information field causes the archiving module to permit archiving of the data object violating the protocol.

17 Claims, 5 Drawing Sheets

500

502 {
To: rhsatrhs@mail.com ⟋506
Subject: Clean Message ⟋508
From: Richard email2.com ⟋510
Date: Fri 1, June 2012 17.04:00 ⟋512

504 {
511 {
Subject: Impor?ant message ⟋514
TO: joe,user@company.com ⟋516
From: jane.user@anothercompany.com ⟋518
Date: Thi, 31 May 2012 10:18:05 -0400 ⟋520

This is an important message ⟋522

*Fig. 5*

PROTOCOL COMPLIANT ARCHIVING

BACKGROUND

Archiving is the process of storing and indexing data so that it may be easily retrievable at a later date. In addition to backup and disaster recovery, other motives for archiving data may include regulatory compliance or legal discovery. Any type of document may be archived including e-mails, instant messages, or word documents.

BRIEF DESCRIPTION OF THE DRAWINGS

FIG. 5 is an example of a data object in accordance with aspects of the present disclosure.

DETAILED DESCRIPTION

Figure 1:
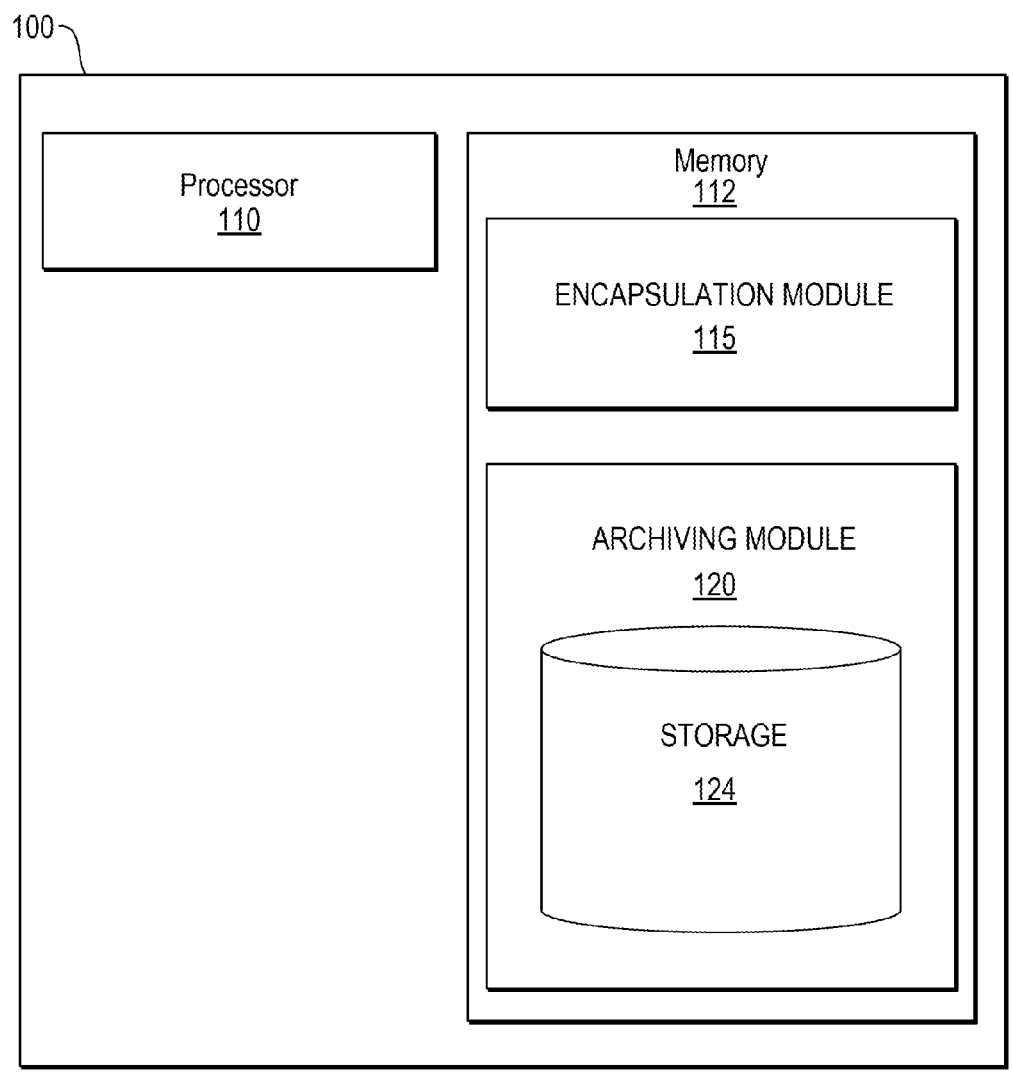
FIG. 1 is a block diagram of an example system for implementing the archiving techniques disclosed herein.

As noted above, archiving systems may store and index data objects. In one example, a data object may be defined as a series of bytes, such as e-mails, instant messages, word documents, or extensible markup ("XML") files. Archiving and indexing these data objects may be a challenge in view of the different types of protocols used in systems today. Archiving systems may reject data objects that do not comply with certain protocols. However, data objects may be constructed in accordance with a protocol different than what the archiving module expects. Archiving systems may reject these non-compliant messages because the indexing of these data objects are based on information fields therein. If the information fields in the data objects are not interpretable by the archiving module, it may not be able to index the data object properly. For example, some e-mail archiving systems may permit archiving of e-mails compliant with a standard protocol, such as the Request for Comments ("RFC") 822 standard published by the Internet engineering task force ("IETF"). However, some e-mail applications construct or receive e-mails that do not conform to the standard protocol. These e-mails may be rejected by the archiving module, since the archiving module may not be able to interpret the e-mail and would have no basis for generating an index. As such, these non-compliant e-mails may be displaced.

In view of the foregoing, various examples disclosed herein provide a system, non-transitory computer-readable medium, and method that may access a data object rejected by an archiving module that permits archiving of data objects constructed in compliance with a protocol. In another example, it may be determined whether the data object was rejected due to an information field thereof violating the protocol. If the data object was rejected due to a violation of the protocol, a compliant information field that complies with the protocol may be generated. The data object may be combined with the compliant information field. The compliant information field may cause the archiving module to permit archiving of the data object.

The techniques disclosed herein may archive data objects even when the protocol thereof differs from the protocol used by an archiving module. The validation procedures of an archiving module may be circumvented with information fields that comply with its protocol while maintaining the non-compliant information fields of the data object. As such, the examples disclosed herein ensure that data objects are not rejected by an archiving module. In addition, the techniques disclosed herein may enable an archiving module to index data objects that do not conform to the protocol by converting at least some data in the non-compliant information fields into data that is at least partially interpretable by the archiving module. The aspects, features and advantages of the present disclosure will be appreciated when considered with reference to the following description of examples and accompanying figures. The following description does not limit the application; rather, the scope of the disclosure is defined by the appended claims and equivalents.

FIG. 1 presents a schematic diagram of an illustrative computer apparatus 100 depicting various components in accordance with aspects of the present disclosure. The computer apparatus 100 may include all the components normally used in connection with a computer. For example, it may have a keyboard and mouse and/or various other types of input devices such as pen-inputs, joysticks, buttons, touch screens, etc., as well as a display, which could include, for instance, a CRT, LCD, plasma screen monitor, TV, projector, etc. Computer apparatus 100 may also comprise a network interface (not shown) to communicate with other devices over a network using conventional protocols (e.g., Ethernet, Wi-Fi, Bluetooth, etc.).

The computer apparatus 100 may also contain a processor 110 and memory 112. Memory 112 may store instructions that may be retrieved and executed by processor 110. In one example, memory 112 may be a random access memory ("RAM") device. In a further example, memory 112 may be divided into multiple memory segments organized as dual in-line memory modules (DIMMs). Alternatively, memory 112 may comprise other types of devices, such as memory provided on floppy disk drives, tapes, and hard disk drives, or other storage devices that may be coupled to computer apparatus 100 directly or indirectly. The memory may also include any combination of one or more of the foregoing and/or other devices as well. The processor 110 may be any number of well known processors, such as processors from Intel® Corporation. In another example, the processor may be a dedicated controller for executing operations, such as an application specific integrated circuit ("ASIC"). Furthermore, computer apparatus 100 may actually comprise multiple processors and memories working in tandem.

The instructions residing in memory 112 may comprise any set of instructions to be executed directly (such as machine code) or indirectly (such as scripts) by processor 110. In that regard, the terms "instructions," "scripts," "applications," and "modules" may be used interchangeably herein. The computer executable instructions may be stored in any computer language or format, such as in object code or modules of source code. Furthermore, it is understood that the instructions may be implemented in the form of hardware, software, or a combination of hardware and software and that the examples herein are merely illustrative.

Encapsulation module 115 may implement the techniques described in the present disclosure. In that regard, encapsulation module 115 may be realized in any non-transitory computer-readable media for use by or in connection with an instruction execution system such as computer apparatus 100, an ASIC or other system that can fetch or obtain the logic from non-transitory computer-readable media and execute the instructions contained therein. "Non-transitory computer-readable media" may be any media that can contain, store, or maintain programs and data for use by or in connection with the instruction execution system. Non-transitory computer readable media may comprise any one of many physical media such as, for example, electronic, magnetic, optical, electromagnetic, or semiconductor media. More specific examples of suitable non-transitory computer-readable media include, but are not limited to, a portable magnetic computer diskette such as floppy diskettes or hard drives, a read-only memory ("ROM"), an erasable programmable read-only memory, or a portable compact disc.

Archiving module 120 may be any software and/or hardware solution for information retention and retrieval. Such archiving solutions are considered to be within the scope of the present disclosure. One example of an archiving solution is the information archiving platform ("IAP") distributed by Hewlett Packard. Archiving module 120 may index the data objects so that they may be readily retrieved at a later time. The index may be based on information provided in at least one information field of the data object. By way of example, if the data object is an e-mail, the header field may include a subject of the e-mail, the sender of the e-mail, the recipient of the e-mail, and/or a timestamp of the e-mail. The e-mail may be indexed based on this header information.

Processor 110 may also retrieve, store, or modify archived data stored in storage 124. Although the architecture of storage 124 is not limited by any particular data structure or product, the archived data may be stored in computer registers, in a relational database with tables having a plurality of different fields and records, XML documents or flat files. The data may also be formatted in any computer-readable format. Furthermore, the data may comprise any information sufficient to identify the relevant information, such as numbers, descriptive text, proprietary codes, references to data stored in other areas of the same memory or different memories (including other network locations) or information that is used by a function to calculate the relevant data.

Figure 2:
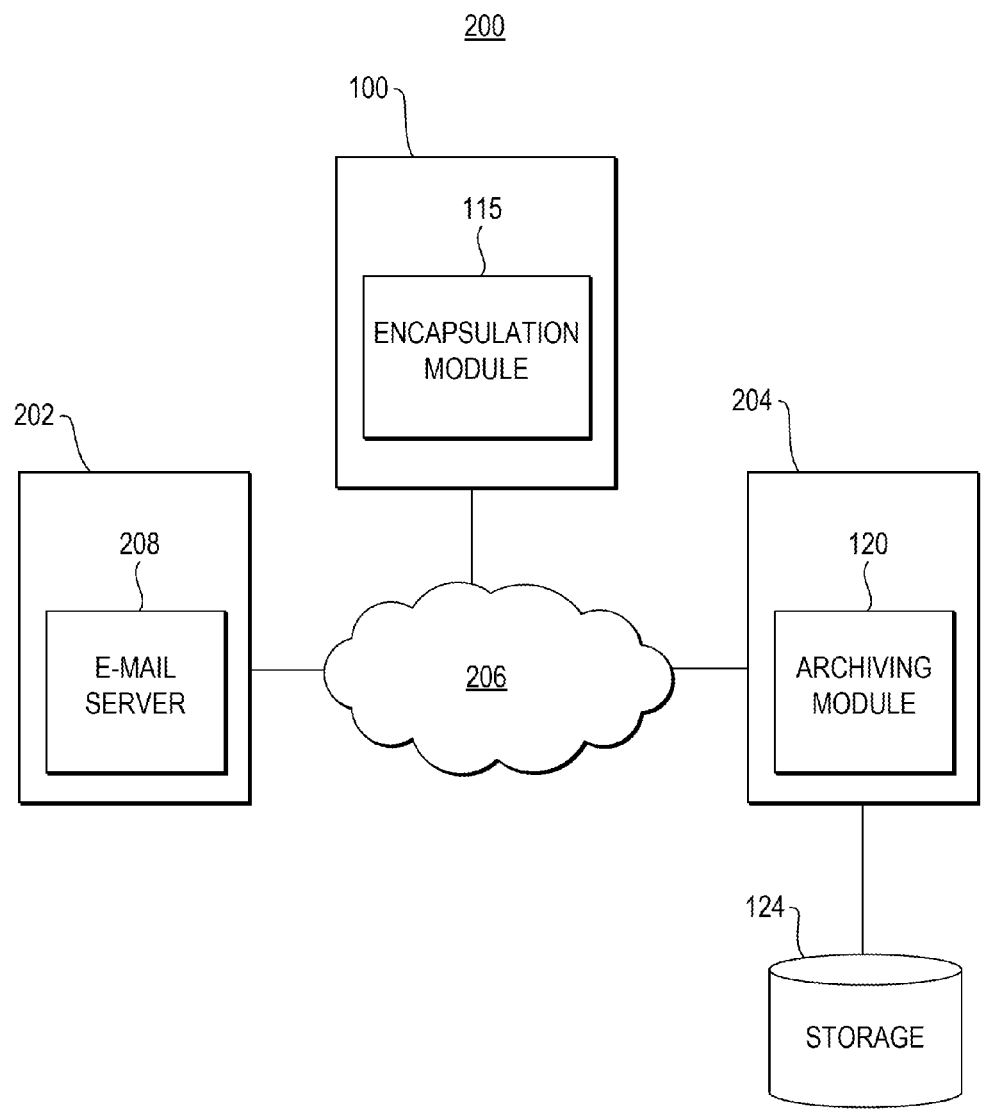
FIG. 2 is a block diagram of an alternate example system implementing the archiving techniques disclosed herein.

Although all the components of computer apparatus 100 are functionally illustrated in FIG. 1 as being within the same block, it will be understood that the components may or may not be stored within the same physical housing. FIG. 2 shows an alternate example system 200 that may be used for archiving e-mails. In FIG. 2, the components are shown distributed among three similarly configured computer apparatus 202, 100, and 204. Computer 204 may execute the archiving module 120 and may also include storage 124; computer 202 may execute a server that receives e-mails, such as an e-mail server 208; computer 100 may execute encapsulation module 115. Computers 100, 202, and 204 may communicate via a network 206. Network 206 may comprise various configurations and use various protocols including the Internet, World Wide Web, intranets, virtual private networks, local Ethernet networks, private networks using communication protocols proprietary to one or more companies, cellular and wireless networks (e.g., WiFi), instant messaging, HTTP and SMTP, and various combinations of the foregoing. Although only three computers are depicted in FIG. 2, it should be appreciated that a system may be distributed in a variety of ways and can include a larger number of networked computers. Furthermore, while the examples herein make reference to e-mail archiving, it should be understood that the techniques disclosed herein may be applied to any data object generated in accordance with a protocol different than the protocol used by the archiving system for validation.

Figure 3:
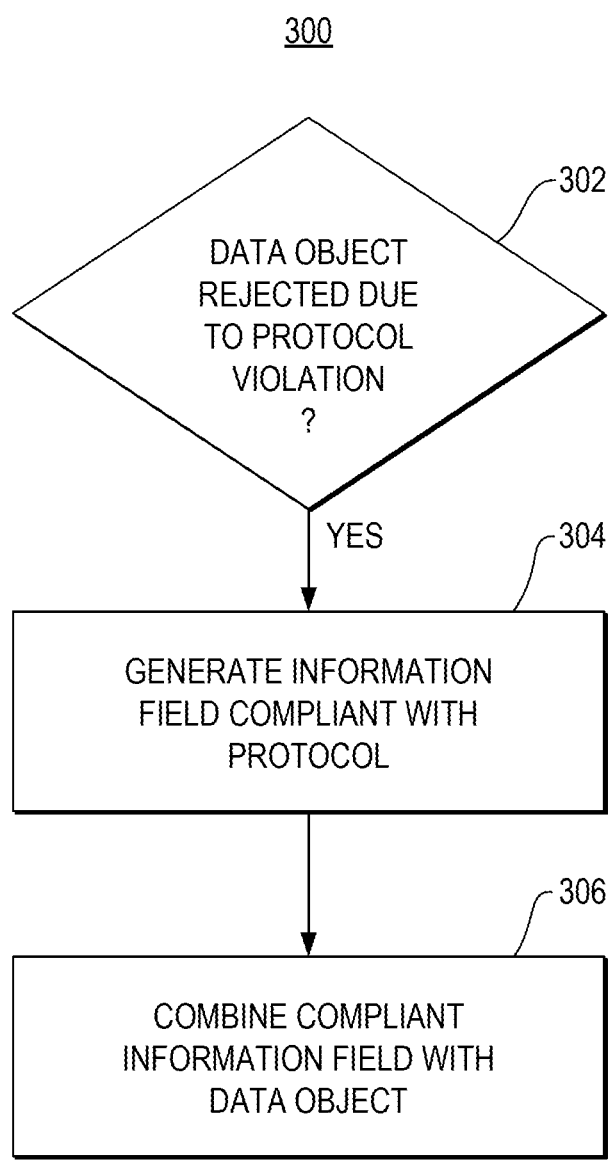
FIG. 3 is a flow diagram of an example method in accordance with aspects of the present disclosure.
Figure 4:
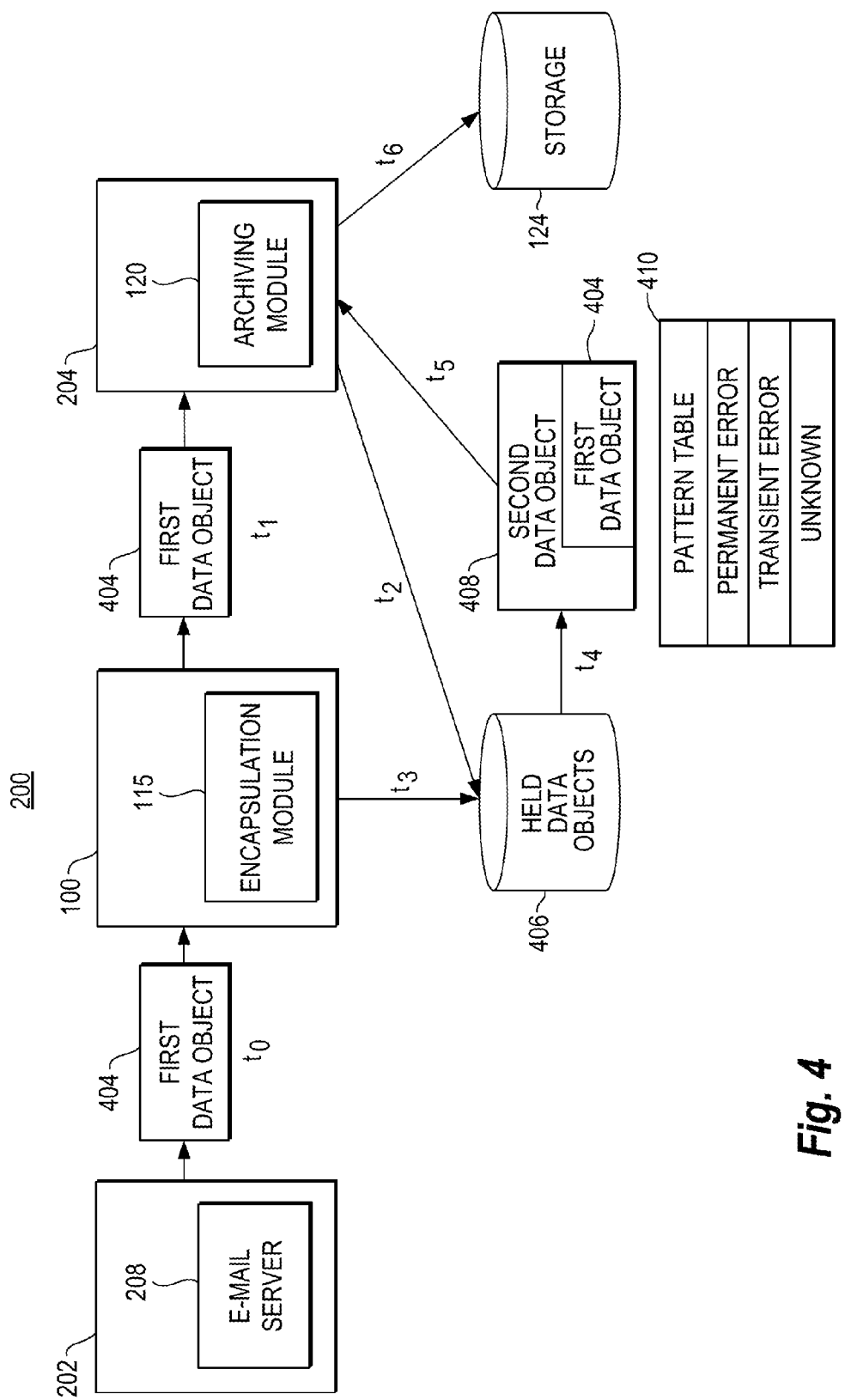
FIG. 4 is a working example of archiving in accordance with the techniques disclosed herein.

One working example of the system, method, and non-transitory computer-readable medium is shown in FIGS. 3-5. In particular, FIG. 3 illustrates a flow diagram of an example method for archiving data objects in accordance with aspects of the present disclosure. FIGS. 4-5 show a working example of data object archiving in accordance with the techniques disclosed herein. The actions shown in FIGS. 4-5 will be discussed below with regard to the flow diagram of FIG. 3.

As shown in FIG. 3, it may be determined whether a data object was rejected due to a protocol violation, as shown in block 302. In one example, encapsulation module 115 may determine whether the data object was rejected due to an information field thereof violating the protocol.

Using the example e-mail archiving system 200, FIG. 4 demonstrates aspects of the present disclosure. In the example of FIG. 4, at time $t_0$, a first data object 404 may be received by encapsulation module 115 executing in computer apparatus 100. In this example, first data object 404 is an e-mail data object. At time $t_1$, archiving module 120, which is shown executing in computer 204, may validate the data object to ensure it complies with a protocol, such as RFC 822. As noted above, many data objects, such as e-mails, may include information fields. E-mails, for example, may include a header comprising a series of fields that specify the originator of the e-mail, the recipient of the e-mail, the subject of the e-mail, and/or a timestamp. A protocol may specify, for example, the maximum or minimum length of each field in the header or the order of the fields therein. Thus, the archiving module 120 may instruct a processor to parse the header in accordance with a protocol's specifications. At time $t_2$, archiving module 120 may determine that at least one information field of first data object 404 fails to comply with a protocol. If so, archiving module 120 may forward the data object to a held data objects database 406, and archiving module may log the error in error pattern table 410. At time $t_3$, encapsulation module 115 may use error pattern table 410 to determine whether archiving module 120 rejected first data object 404 due to an information field thereof violating the protocol. In one example, an error pattern may be defined as a previously generated archiving error message caused by a protocol violation. Error pattern table 410 may be, for example, a database table, an XML file, or a flat file containing various error rejection messages generated by archiving module 120. In one example, encapsulation module 115 may deem a "permanent error" to be associated with a non-compliant information field. Thus, if encapsulation module 115 determines that first data object 404 was rejected due to a "permanent error," it may assume that this was caused due to a non-compliant information field. However, it is understood that the error messages of table 410 are merely illustrative and that other types of error messages may be stored therein.

Referring back to FIG. 3, an information field may be generated that is compliant with the protocol, as shown in block 304. In block 306, the compliant information field may be combined with the data object (e.g., first data object 404). In the example of FIG. 4, at time $t_4$, a second data object 408 may be generated that comprises the compliant information field and the first data object 404. That is, the compliant information field may be combined with the first data object and stored or "encapsulated" in second data object 408. The compliant information field may cause archiving module 120 to permit archiving of first data object 404 confined in second data object 408. In one example, some of the data in the non-compliant information field of first data object 404 may be converted into data that is at least partially interpretable by archiving module 120 so as to facilitate the indexing of first data object 404 confined in second data object 408. Such conversion may enable archiving module 120 to index first data object 404. Since the information field of first data object 404 does not comply with the protocol, the field may be encoded in some format not interpretable by archiving module 120. Thus, converting the information field as much as possible may help the archiving module to index the data object. In one example, binary data stored in the information field may be translated in accordance with the American Standard Code for Information Interchange ("ASCII") to convert the binary into plain text. In another aspect, encapsulation module 115 may flag second data object 408 to alert archiving module 120 to attempt archiving first data object 404 confined in second data object 408.

Referring back to FIG. 4, archiving module 120 may receive second data object 408 at time $t_5$. Second data object 408 may be stored and indexed at time $t_6$. Since the information field of second data object 408 is compliant with the protocol, the archiving module 120 may accept the second data object and ignore the non-compliant information field of the first data object enclosed therein. Thus, the protocol validation of archiving module 120 may be circumvented by encapsulating first data object 404 in second data object 408.

Referring now to FIG. 5, an illustrative e-mail 500 is shown having a compliant header 502 and an encapsulated e-mail 504. Encapsulated e-mail 504 may have a header 511 that violates a protocol used by archiving module 120 for validation. Header 511 may comprise a subject field 514, a recipient field 516, a sender field 518, and a date field 520. In addition, encapsulated e-mail 504 may have a message body 522. Header field 511 is shown converted into plain text or ASCII, which may be at least partially interpretable by an archiving module. While not all of the characters therein are interpretable after the conversion, the characters that are interpretable may facilitate indexing of e-mail 504. In the example of FIG. 5, subject field 514 may have been the only non-compliant field. Thus, when converted to plain text, the field becomes "Impor?ant message." In another aspect, the original unconverted data object may be attached to the second data object. Header 502 may be the compliant header that may cause the archiving module to archive e-mail 504 encapsulated in e-mail 500. The Header 502 compliant with the protocol may also have a recipient field 506, a subject field 508, a sender field 510, and a date field 512. In another example, the compliant information field, such as header 502, may include tracking information associated with the first data object (e.g. e-mail 504) confined in the second data object (e.g. e-mail 500) that may allow an archiving module to trace and retrieve the first data object. In yet a further example, the compliant information field may include configurable destination information to forward the second data object (e.g., e-mail 500) to a predetermined repository other than held data objects database 406 to facilitate retrieval thereof by an archiving module.

Advantageously, the above-described computer apparatus, non-transitory computer readable medium, and method ensure that data objects of a given system are archived notwithstanding the protocol thereof. In this regard, organizations whose policy requires archiving of data objects associated therewith can be rest assured that data objects will not be displaced. Furthermore, conversion of at least some of the data in the non-compliant fields may facilitate indexing of the data object.

Although the disclosure herein has been described with reference to particular examples, it is to be understood that these examples are merely illustrative of the principles of the disclosure. It is therefore to be understood that numerous modifications may be made to the examples and that other arrangements may be devised without departing from the spirit and scope of the disclosure as defined by the appended claims. Furthermore, while particular processes are shown in a specific order in the appended drawings, such processes are not limited to any particular order unless such order is expressly set forth herein. Rather, processes may be performed in a different order or concurrently and steps may be added or omitted.

The invention claimed is:

1. A system comprising:
   a processor; and
   a memory coupled to the processor, the memory comprising:
   an archiving module to store and index data objects, the index being based on at least one information field of the data object, the archiving module being a module to permit archiving of data objects that comply with a protocol; and
   an encapsulation module which, if executed, causes the processor to:
   determine whether the archiving module rejected a first data object due to an information field thereof violating the protocol; and
   if the archiving module rejected the first data object due to a violation of the protocol, generate a second data object, the second data object comprising the first data object and a compliant information field that complies with the protocol such that the compliant information field causes the archiving module to permit archiving of the first data object confined in the second data object, when the archiving module accesses the second data object.

2. The system of claim 1, wherein the processor is a processor to convert at least some data in the information field of the first data object into data that is at least partially interpretable by the archiving module to facilitate indexing of the first data object confined in the second object.

3. The system of claim 1, wherein the compliant information field includes configurable destination information such that the first data object confined in the second data object is able to be forwarded to a predetermined repository.

4. The system of claim 1, wherein the compliant information field includes tracking information to facilitate tracing and retrieval of the first data object confined in the second data object by the archiving module.

5. The system of claim 1, wherein the processor is a processor to detect an error pattern in the information field of the first data object to determine whether the information field of the first data object violates the protocol.

6. The system of claim 1, wherein the processor is a processor to flag the second data object to alert the archiving module to attempt archiving the second data object with the first data object confined therein.

7. A method comprising:
   accessing, using a processor, a first data object rejected by an archiving module;
   analyzing, using the processor, an error pattern table containing at least one rejection error code generated by the archiving module;
   determine, using the processor, whether the archiving module rejected the first data object due to an information field thereof violating a protocol based on the at least one rejection error code in the error pattern table;
   If the archiving module rejected the first data object due to a violation of the protocol:
   generating, using the processor, a second data object, the second data object comprising the first data object and a compliant information field that complies with the protocol such that the compliant information field causes the archiving module to permit archiving of the first data object confined in the second data object, when the archiving module accesses the second data object; and converting, using the processor, at least some data in the information field of the first data object such that the information field is at least partially interpretable by the archiving module to enable the archiving module to index the first data object confined in the second data object.

8. The method of claim 7, further comprising forwarding, using the processor, the first data object confined in the second data object to a predetermined depository based on destination information specified in the compliant information field.

9. The method of claim 7, wherein the compliant information field includes tracking information to facilitate tracing and retrieval of the first data object confined in the second data object by the archiving module.

10. The method of claim 7, further comprising signaling, using the processor, the archiving module to attempt archiving the second data object with the first data object confined therein by flagging the second data object.

11. A non-transitory computer readable medium having instructions therein which, if executed, cause a processor to:
  access a data object rejected by an archiving module of a storage system, the archiving module permitting archiving of data objects that comply with a protocol;
  determine whether the data object was rejected due to an information field thereof violating the protocol;
  If the data object was rejected due to a violation of the protocol:
    generate a compliant information field that complies with the protocol; and
    combine the data object with the compliant information field such that the compliant information field causes the archiving module to permit archiving of the data object.

12. The non-transitory computer readable medium of claim 11, wherein the data object and the compliant information field are stored in a second data object.

13. The non-transitory computer readable medium of claim 12, wherein the instructions stored therein, if executed, further cause a processor to convert at least some data in the information field of the data object into data that is at least partially interpretable by the archiving module to facilitate indexing of the data object confined in the second data object.

14. The non-transitory computer readable medium of claim 12, wherein the compliant information field includes configurable destination information such that the data object confined in the second data object is able to be forwarded to a predetermined repository.

15. The non-transitory computer readable medium of claim 12, wherein the compliant information field includes tracking information to facilitate tracing and retrieval of the data object confined in the second data object by the archiving module.

16. The non-transitory computer readable medium of claim 12, wherein the instructions stored therein, if executed, further causes a processor to flag the second data object to signal the archiving module to attempt archiving the second data object with the data object confined therein.

17. The non-transitory computer readable medium of claim 11, wherein the instructions stored therein, if executed, further causes a processor to detect an error pattern in the information field of the data object to determine whether the information field of the data object violates the protocol.

* * * * *